United States Patent [19]
Miyata et al.

[11] Patent Number: 5,957,769
[45] Date of Patent: Sep. 28, 1999

[54] BLOWER UNIT FOR AUTOMOBILE AIR CONDITIONER

[75] Inventors: Manabu Miyata, Obu; Kazushi Shikata, Kariya, both of Japan

[73] Assignee: Denso Corporation, Kariya, Japan

[21] Appl. No.: 09/175,865

[22] Filed: Oct. 20, 1998

[30] Foreign Application Priority Data

Oct. 21, 1997 [JP] Japan .................................. 9-288942

[51] Int. Cl.⁶ .................................................. B60H 1/32
[52] U.S. Cl. ............................................ 454/69; 454/139
[58] Field of Search ............................ 454/69, 121, 139, 454/140, 156; 165/41, 42, 43

[56] References Cited

FOREIGN PATENT DOCUMENTS 6-255341  9/1994  Japan .
A-10-76834  3/1998  Japan .

Primary Examiner—Harold Joyce
Attorney, Agent, or Firm—Harness, Dickey & Pierce, PLC

[57] ABSTRACT

A blower unit for an automobile air conditioner includes a centrifugal fan having a suction port for sucking outside air, and a motor for rotating the fan. The motor is disposed approximately horizontally to penetrate through the suction port of the fan. One end of the fan in an axial direction is connected to a rotation shaft of the motor by a connection member, and a water-prevention member is disposed on an outer peripheral surface of the motor at an inner peripheral side of the one end of the fan in the axial direction. The water-prevention member prevents water dropped onto the outer peripheral surface of the motor from moving to a side of the connection member. Further, the water-prevention member includes a groove portion for receiving water dropped from the one end of the fan along the connection member. Thus, in the blower unit, the water-prevention member prevents water from flowing into the motor.

20 Claims, 7 Drawing Sheets

BLOWER UNIT FOR AUTOMOBILE AIR CONDITIONER

CROSS-REFERENCE TO RELATED APPLICATION

This application is related to and claims priority from Japanese Patent Application No. 9-288942 filed on Oct. 21, 1997, the contents of which are hereby incorporated by reference.

BACKGROUND OF THE INVENTION

1. Field of the Invention

The present invention relates to a blower unit in which a rotation shaft of a motor for driving a centrifugal fan is disposed horizontally and a water-prevention structure for preventing water from flowing into the motor is provided. The blower unit is suitable for an automobile air conditioner which can set an inside/outside air double layer mode in which both inside air (i.e., air inside a passenger compartment) and outside air (i.e., air outside the passenger compartment) are blown into the passenger compartment while being partitioned from each other.

2. Description of Related Art

In a conventional blower unit for an automobile air conditioner, a scroll casing has an outside air suction port for introducing outside air, and a centrifugal fan for sucking outside air from the outside air suction port is accommodated in the scroll casing. Further, a driving motor for driving the centrifugal fan is disposed to penetrate through the outside air suction port, and a rotation shaft of the driving motor is disposed horizontally. Therefore, when an inside/outside air double layer mode or an entire outside air mode is set so that outside air is introduced from the outside air suction port, water contained in outside air falls to an outer surface of the driving motor from an upper side by the specific gravity during raining or snowing, for example. On the other hand, the driving motor has a body case, and the driving motor is cooled by air flowing through the body case. Therefore, an opening for discharging the air is provided in the body case of the driving motor, for example. Thus, the dropped water flows into the driving motor from the opening, and operation performance and durability of the driving motor is decreased.

SUMMARY OF THE INVENTION

In view of the foregoing problems, it is a first object of the present invention to provide a blower unit for an automobile air conditioner, in which a motor is disposed approximately horizontally and penetrates through a suction port for introducing outside air, while it can prevent water from flowing into the motor.

It is a second object of the present invention to provide a blower unit for an automobile air conditioner, which improves cooling effect of a motor while preventing water from flowing into the motor.

According to the present invention, in a blower unit for an automobile air conditioner, a motor is disposed at an inner peripheral side of a centrifugal fan to penetrate through a suction port for introducing outside air, and has a rotation shaft disposed approximately horizontally. A first end of the centrifugal fan in an axial direction is connected to a rotation shaft of the motor by a connection member, and a first rib is disposed at least on an upper portion of an outer peripheral surface of the motor at an inner peripheral side of the first end of the centrifugal fan to prevent water dropped on the outer peripheral surface from moving to a side of the connection member. The first rib has an end extending to an outer peripheral side of the centrifugal fan, the end of the first rib is positioned adjacent to the connection member. Thus, the first rib prevents water dropped on the outer peripheral surface of the motor from moving to a connection portion between the rotation shaft of the motor and the connection member.

Preferably, the first rib is formed along all the outer peripheral surface of the motor to have a ring shape. Therefore, even when water gathered in a lower side of a casing of the centrifugal fan is blown off by the rotation of the centrifugal fan, the first rib can prevent water from flowing into the motor.

Further, a second rib protruding from the outer peripheral surface of the motor is formed to have an end extending to the outer peripheral side of the centrifugal fan, and the second rib is formed at a side of the first rib to be far from the connection member in the axial direction. In the blower unit, the first rib and the second rib are disposed to form a groove portion for receiving water dropped from the first end of the centrifugal fan along the connection member. Thus, the first rib and the second rib forms a water-prevention structure for preventing the dropped water from flowing into the motor. As a result, operation performance and durability of the motor can be improved.

More preferably, the blower unit includes an air duct for introducing air into the motor, and the air duct forms a part of a cool air passage through which air for cooling the motor flows. In the blower unit, the cool air passage is provided in such a manner that air is introduced from a positive pressure portion at an air outlet side of the centrifugal fan to one end portion of the motor at a side of the second end of the centrifugal fan in the axial direction, and flows to an air suction side of the centrifugal fan from the other end portion of the motor at a side of the connection member after being passed through the motor. Further, the connection member includes supplementary blades formed on a surface at a side where the cool air passage is provided, and the supplementary blades blow air having passed through the motor to the air suction side of the centrifugal fan. Thus, components of the motor, around the connection member, can be uniformly cooled by air flowing in the cool air passage, and an amount of air for cooling the motor can be increased by the supplementary blades to improve cooling effect of the motor.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
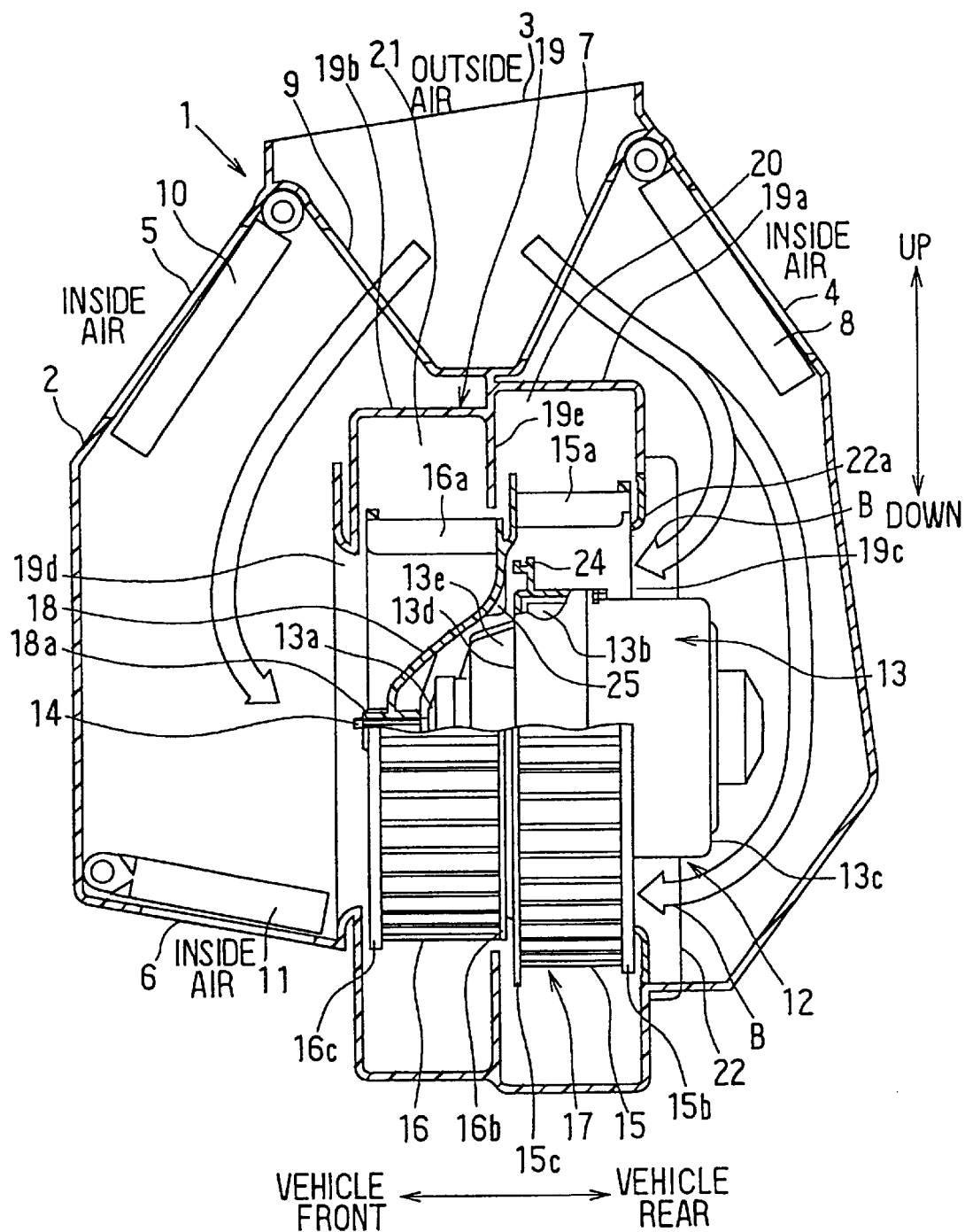
FIG. 1 is a vertical sectional view showing a blower unit according to a first preferred embodiment of the present invention.

Preferred embodiments of the present invention are described hereinafter with reference to the accompanying drawings.

A first preferred embodiment of the present invention will be now described with reference to FIGS. 1–5. A blower unit 1 is disposed in a passenger compartment of a vehicle at an offset position shifted from a center of an instrument panel in a width direction of the vehicle. That is, in a vehicle having a right steering wheel, the blower unit 1 is disposed at a left side (i.e., front passenger's side). The blower unit 1 is mounted in the vehicle in a direction shown in FIG. 1. The blower unit 1 has a unit case 2 made of resin such as polypropylene, and an outside air introduction port 3 is provided on an upper surface portion of the unit case 2 at an approximate center in a front-rear direction of the vehicle. On front and rear sides of the outside side air introduction port 3 in the front-rear direction, first and second inside air introduction ports 4, 5 are provided in the unit case 2.

Further, a third inside air introduction port 6 is provided in the unit case 2 at a front lower side. A first inside/outside air switching door 8 formed in a plate like opens and closes the first inside air introduction port 4 and a first communication port 7 communicating with the outside air introduction port 3. A second inside/outside air switching door 10 formed in a plate like opens and closes the second inside air introduction port 5 and a second communication port 9 communicating with the outside air introduction port 3. Further, a third inside/outside air switching door 11 formed in a plate like opens and closes the third inside air introduction port 6.

On the other hand, a blower 12 is disposed within the unit case 2 at a center lower position. The blower 12 has a motor 13 for driving a centrifugal fan 17 composed of first and second fans 15, 16, and the centrifugal fan 17 is connected to a rotation shaft 14 rotating with a rotor 13a of the motor 13. Both the first and second fans 15, 16 are centrifugal multi-blades fans (e.g., sirocco fan) made of resin.

Figure 3:
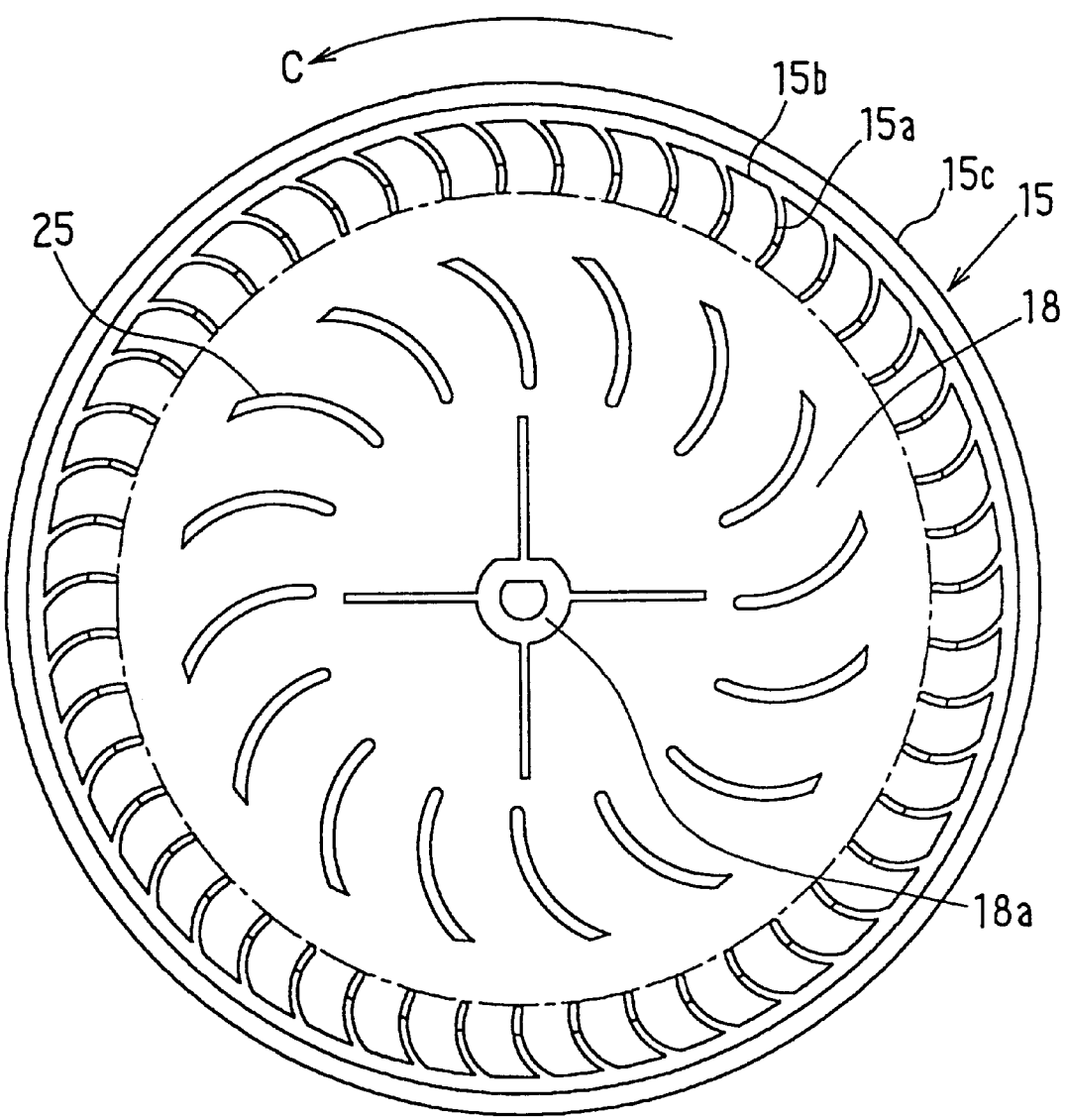
FIG. 3 is a front view of a first centrifugal fan of the blower unit in FIG. 1.

As shown in FIG. 3, the first fan 15 has a plurality of circular-arc shaped blades 15a arranged in a ring shape. One side ends of the blades 15a in an axial direction of the first fan 15 are connected by a holding ring 15b, and the other side ends of the blades 15a in the axial direction are connected by a holding ring 15c. The second fan 16 has a structure similar to that of the first fan 15. That is, the second fan 16 has a plurality of circular-arc shaped blades 16a arranged in a ring shape. One side ends of the blades 16a in the axial direction are connected by a holding ring 16b, and the other side ends of the blades 16a in the axial direction are connected by a holding ring 16c. The adjacent holding rings 15c, 16b of the first and second fans 15, 16 are connected integrally to form a circular connection member 18. A boss portion 18a having approximately a cylindrical shape is formed on an inner peripheral portion of the connection member 18. The first and second fans 15, 16 are connected to the rotation shaft 14 using the boss portion 18a.

A scroll casing 19 for accommodating the centrifugal fan 17 has first and second casings 19a, 19b partitioned from each other. That is, the first fan 15 is accommodated in the first casing 19a, and the second fan 16 is accommodated in the second casing 19b. Thus, an inner space of the scroll casing 19 is partitioned into a first air passage 20 and a second air passage 21. A first suction port 19c communicating with the outside air introduction port 3 or the first inside air introduction port 4 is provided in one side surface of the first casing 19a in the axial direction, and air sucked from the first suction port 19c is blown into the first air passage 20 by the first fan 15. Further, a second suction port 19d communicating with the outside air introduction port 3 or the second and third inside air introduction ports 5, 6 is provided in one side surface of the second casing 19b in the axial direction, and air sucked from the second suction port 19d is blown into the second air passage 21 by the second fan 16.

The motor 13 is disposed at an inner peripheral side of the first fan 15 to penetrate through the first suction port 19c, and the rotation shaft 14 of the motor 13 is disposed approximately horizontally. The first and second air passages 20, 21 are partitioned from each other by a ring-shaped partition plate 19e integrated with an inner surface of the unit case 2, the connection member 18 and the holding rings 15c, 16b. Therefore, in the first embodiment, the connection member 18 also functions as a partition member.

Figure 2:
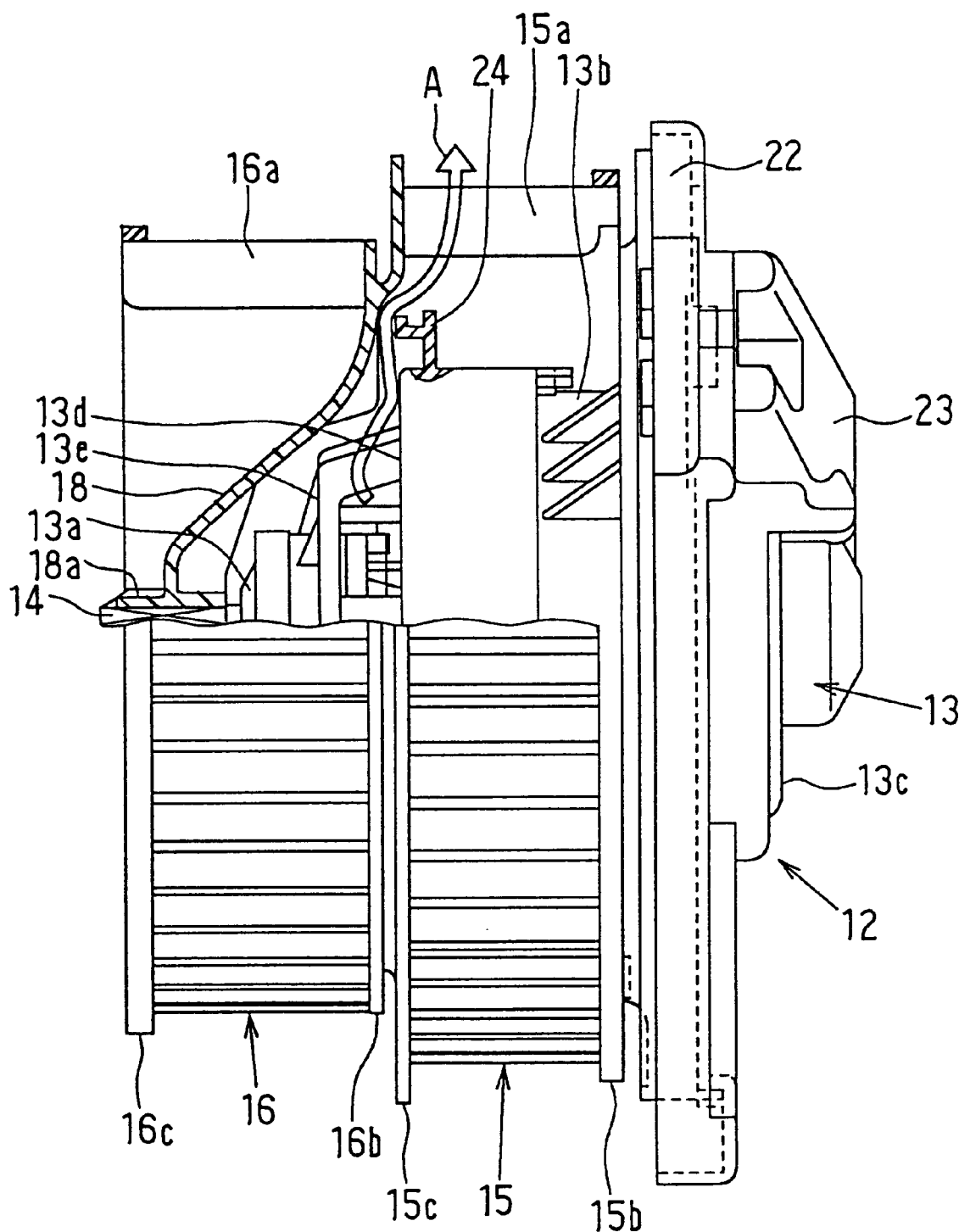
FIG. 2 is a detail view showing a blower of the blower unit in FIG. 1.
Figure 4:
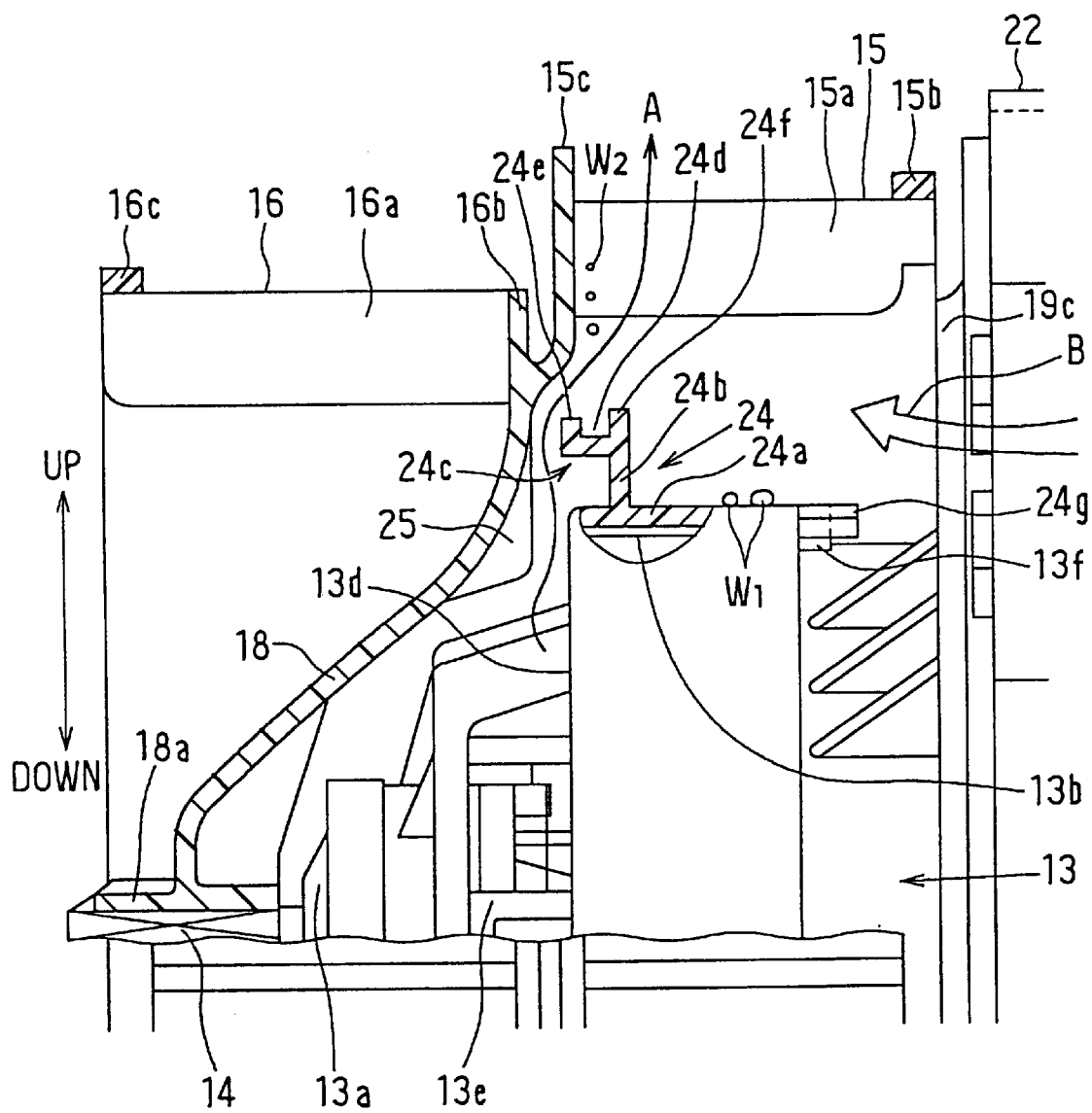
FIG. 4 is an enlarged sectional view showing a main portion in FIG. 1.

As shown in FIG. 2, the motor 13 is attached to the first casing 19a of the scroll casing 19 using an attachment stay 22. The attachment stay 22 is formed integrally with a resinous body case 13b of the motor 13, as shown in FIGS. 1 and 4. The attachment stay 22 has a plurality of arm portions (e.g. three arm portions in the first embodiment) extending from an outer peripheral surface of the body case 13b in a radial shape. Outer peripheral ends of the arm portions of the attachment stay 22 are connected using an outer peripheral ring portion, and the outer peripheral ring portion of the attachment stay 22 is attached to the first casing 19a by using a fastening member such as a screw clip.

The first suction port 19c of the first fan 15 is provided between the arm portions. A guide surface 22 having a bell-mouse shaped section is formed in the outer peripheral ring portion of the attachment stay 22 to smoothly guiding air into the first suction port 19c. As shown in FIG. 2, an air duct 23 for introducing air for cooling the motor 23 from a positive-pressure potion at an air-outlet side of the first fan 15 in the first air passage 20 is formed along the arm portions of the attachment stay 22. Air from the air duct 23 flows into the motor 13 from an opening of a first end 13c (i.e., the end opposite to the connection member 18) of the motor 13 to cool the motor 13. After cooling the motor 13, air flows to the outside of the motor 13 as shown by arrow A in FIGS. 2, 4 from an opening of a second end 13d (i.e., the end adjacent to the connection member 18) of the motor 13. The opening of the second end 13d of the motor 13 is a clearance of a stator 13e of the motor 13 and a clearance between the stator 13e and the rotor 13a, for example.

Next, a water-prevention structure for preventing water from flowing into the motor 13, which is a main portion of the present invention, will be now described in detail. A water-prevention member 24 is provided on an outer peripheral surface of the body case 13b of the motor 13. In the first embodiment, the water-prevention member 24 is formed along the outer peripheral surface in a ring shape. The water-prevention member 24 is made of resin, and is formed separately from the resinous body case 13b. The water-prevention member 24 is formed on the outer peripheral surface of the body case 13b at an inner peripheral side of one end of the first fan 15 in the axial direction, proximate to the second fan 16.

As shown in FIG. 4, the water-prevention member 24 includes an inner peripheral portion 24a formed along the outer peripheral surface of the body case 13b in a ring shape, and a flange portion 24b extending from the inner peripheral portion 24a in a radial outside. A groove portion 24c is formed at an outer peripheral end of the flange portion 24b. The groove portion 24c receives water dropping from the one end of the first fan 15 in the axial direction along the connection member 18, as shown in FIG. 4. The groove portion 24c having a U-shaped cross section includes a recess portion 24d, a first wall 24e positioned at an end of the recess 24d in the axial direction, adjacent to the connected member 18, and a second wall 24f positioned at the other end of the recess 24d in the axial direction. That is, the second wall 24f is formed at a side to be separated from the connection member 18. As shown in FIG. 4, the recess 24d is positioned at a direct lower side of an inner wall surface of the holding ring 15c.

Figure 5A:
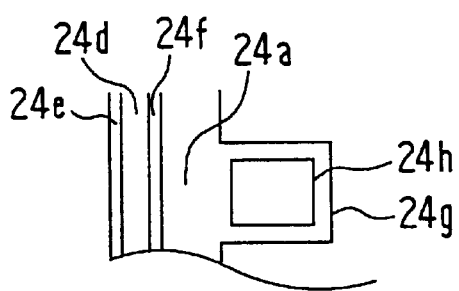
FIGS. 5A, 5B, 5C, 5D are diagrammatic view for explaining an assemble between a water-prevention member and a motor.
Figure 5C:
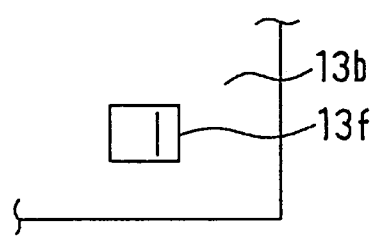
Figure 5B:
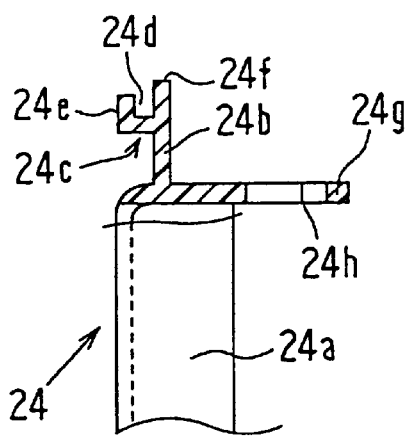
Figure 5D:
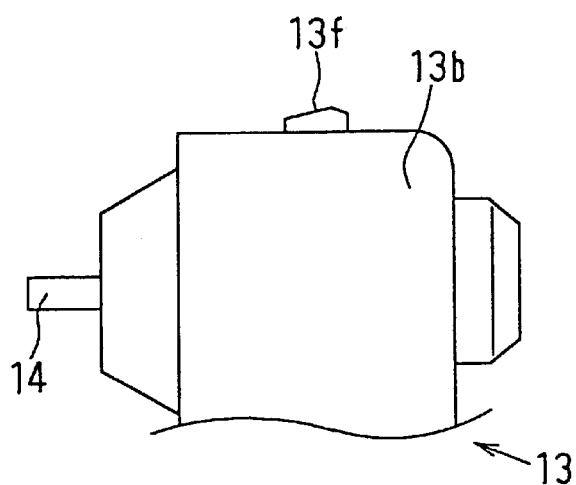

Here, an attachment structure for attaching the water-prevention member to the body case 13b will be described. As shown in FIGS. 5A, 5B, in the inner peripheral portion 24a of the water-prevention member 24, there is formed a plurality of attachment claw portions 24g protruding from the inner peripheral portion 24a in the axial direction (i.e., a direction going away from the connection member 18). An attachment hole 24h is provided in each the attachment claw portion 24g. On the other hand, as shown in FIGS. 5C, 5D, a protrusion portion 13f engaging with the attachment hole 24h is formed on the outer peripheral surface of the body case 13b. The water-prevention member 24 shown in FIGS. 5A, 5B moves from a left side to a right side in FIGS. 5A–5D to be engaged with the protrusion 13f of the body case 13b of the motor 13. That is, the attachment claw portion 24g of the water-prevention member 24 is elastically deformed along an inclination of an upper surface of the protrusion portion 13f so that the protrusion portion 13f of the body case 13b is inserted into the attachment hole 24h of the water-prevention member 24. In the first embodiment, by the engagement between the attachment hole 24h and the protrusion portion 13f, the water-prevention member 24 is attached to the outer peripheral surface of the motor 13.

A plurality of supplementary blades 25 are formed integrally in the connection member 18 on a surface facing the flow of air shown by allow A. The supplementary blades 25 blows air having passed through the motor 13 so that the air readily flows toward an air suction side of the first fan 15. As shown in FIG. 3, each of the supplementary blades 25 having circular-arc shapes is bent in the same direction as that of the blades 15a of the first fan 15. The supplementary blades 25 are disposed at an inner peripheral side of the blades 15a to have a common rotation center therebetween.

Air outlet sides of the first air passage 20 and the second air passage 21 within the scroll casing 19 are connected to an air conditioning unit (not shown) for adjusting a temperature of air blown into a passenger compartment of the vehicle. The air conditioning unit has a cooling heat exchanger (e.g., evaporator) for cooling air passing therethrough, and a heating heat exchanger (e.g., hot-water type heater core) for heating air passing therethrough. Further, in the air conditioning unit, there is provided with a plurality opening portions such as a foot opening for blowing air toward a foot portion of a passenger in the passenger compartment, a face opening for blowing air toward the upper portion of the passenger, and a defroster opening for blowing air toward an inner surface of a windshield. The foot opening, the face opening and the defroster opening are opened and closed by a mode switching door so that an air outlet mode of the passenger compartment is selected.

An air passage within the air conditioning unit is also partitioned into a first air passage communicating with the first air passage 20 and a second air passage communicating with the second air passage 21. When an inside/outside air double layer mode is set during a heating mode in the winter, outside air is blown into the defroster opening through the first air passage, and inside air is blown into the foot opening through the second air passage. Therefore, outside air having a low humidity is blown toward the inner surface of the windshield from the defroster opening and inside air having a high temperature is heated and is blown toward the foot area of the passenger in the passenger compartment from the foot opening, so that both defrosting performance and the heating capacity for the passenger compartment can be improved.

Next, the operation of the blower unit 1 according to the first embodiment will be now described. When the inside/outside air mode is switched to the inside/outside air double layer mode, the first inside/outside air switching door 8 closes the first inside air introduction port 4 and opens the first communication port 7 communicating with the outside air introduction port 3. The second inside/outside air switching door 10 opens the second inside air introduction port 5 and closes the second communication port 9 communicating with the outside air introduction port 3. Further, the third inside/outside air switching door 11 opens the third inside air introduction port 6. Thus, outside air introduced from the outside air introduction port 3 is sucked by the first fan 15 from the first suction port 19c, and is blown into the first air passage 20 formed by the first casing 19a of the scroll casing 19. On the other hand, inside air introduced from the second and third inside air introduction ports 5, 6 is sucked by the second fan 16 from the second suction port 19d, and is blown into the second air passage 21 formed by the second casing 19b of the scroll casing 19. Thus, the inside/outside air double layer mode is set in the blower unit 1.

When an entire outside air mode where only outside air is introduced into both the first and second air passages 20, 21 is selected, the first inside/outside air switching door 8 closes the first inside air introduction port 4 and opens the first communication port 7 communicating with the outside air introduction port 3. During the entire outside air mode, the second inside/outside air switching door 10 closes the second inside air introduction port 5 and opens the second communication port 9 communicating with the outside air introduction port 3, and the third inside/outside air switching door 11 closes the third inside air introduction port 6. Thus, outside air from the outside air introduction port 3 is sucked into the first suction port 19c of the first fan 15 through the first communication port 7, and is sucked into the second suction port 19d of the second fan 16 through the second communication port 9. Accordingly, during the entire outside air mode, only outside air is blown into both the first and second air passages 20, 21.

When an entire inside air mode is set, only inside air is introduced into both the first and second air passages 20, 21. During the entire inside air mode, the first inside/outside air switching door 8 opens the first inside air introduction port 4 and closes the first communication port 7 communicating with the outside air introduction port 3, the second inside/outside air switching door 10 opens the second inside air introduction port 5 and closes the second communication port 9 communicating with the outside air introduction port 3, and the third inside/outside air switching door 11 opens the third inside air introduction port 6. Thus, inside air from the first inside air introduction port 4 is sucked from the first suction port 19c of the first fan 15, and inside air from the second and third inside air introduction ports 5, 6 is sucked from the second suction port 19*d* of the second fan 16. During the entire inside air mode, because only inside air is sucked from the three inside air suction ports 4, 5, 6, a suction resistance of inside air is reduced to increase a blown-amount of inside air.

When the motor 13 is operated, air for cooling the motor 13 is introduced into the air duct 23 from the positive-pressure portion of the first air passage 20 at the air-blown side of the first fan 15. Air in the air duct 23 flows into the motor 13 from the opening of the first end 13*c*, and flows out from the opening of the second end 13*d* as shown by arrow A in FIG. 2 after cooling the interior of the motor 13. In this case, the flow of air from the opening of the second end 13*d* is disturbed by the supplementary blades 25 formed integrally with the surface of the connection member 18, adjacent to the air flow shown by arrow A in FIG. 2. Therefore, air can be uniformly distributed to peripheral portions of the stator 13*e* of the motor 13 in a circumferential direction thereof. Thus, components of the motor 13, around the stator 13*e*, can be uniformly cooled.

Further, because air having passed through the motor 13 can be readily blown into the air-suction side of the first fan 15 by the supplementary blades 25, the amount of air passing through the motor 13 is increased. Therefore, the cooling effect of the motor 13 is improved, as compared with a case where air passing through the motor 13 flows only using a pressure difference between the positive-pressure portion of the first air passage 20 and the first fan 15. Thus, it can prevent the temperature of the motor 13 from being excessively increased due to heat generated from an electromagnetic coil within the motor 13. As a result, the motor 13 is operated accurately in a long time.

When the inside/outside air double layer mode or the entire outside air mode is selected, outside air is blown by the first fan 15. In this case, during raining or snowing, rain or snow is contained in outside air sucked by the fist fan 15. When outside air containing water flows as shown by arrow B in FIGS. 1, 4 by the operation of the first fan 15, a part of water in the outside air becomes in water drops W1 due to gravity itself, and falls to the outer peripheral surface of the motor 13. The flange portion 24*b* of the water-prevention member 24 prevents the water dropped on the outer peripheral surface of the motor 13 from moving to the side of the connection member 18.

Further, in the first embodiment, the groove portion 24*c* is disposed at a direct lower position of the holding ring 15*c* to receive water drops W2 dropped along an inner wall surface of the holding ring 15*c* and the connection member 18. The inner wall surface of the holding ring 15*c* is positioned at the second end side of the blades 15*a* of the first fan 15 in the axial direction. Thus, it can prevent the water drops W1, W2 from flowing into the motor 12 from opening of the second end 13*d* at the side of the connection member 18.

In the first embodiment, the groove portion 24*c* of the water prevention member 24 has the U-shaped cross-section. In the groove portion 24*c*, the first wall 24*e* has a first height (e.g., 2 mm), and the second wall 24*f* has a second height (e.g., 3 mm) higher than the first height. Thus, it can prevent air (shown by arrow B) blown by the blades 15*a* of the first fan 15 from directly flowing toward the water within the groove portion 24*c*; and therefore, water in the groove portion 24*c* does not moves to the side of the second end 13*d* of the motor 13 after going across the first wall 24*e*. As a result, the operation performance and the durability of the blower 1 can be improved.

According to the first embodiment, water received in the groove portion 24 and water on the inner peripheral portion 24*a* of the water-prevention member 24 fall to the lower side of the motor 13, and are not affected to the motor 13. During the entire outside air mode, the connection member 18 prevents water contained in outside air sucked by the second fan 6 from being flowing into the motor 13.

According to the first embodiment, the water-prevention member 24 is formed in the ring shape along the outer peripheral surface of the body case 13*b*. Therefore, even when water is gathered in a lower side of the first casing 19*a* and the water is blown off by the rotation of the first fan 15, the water-prevention member 24 can prevent the water from flowing into the motor 13.

Figure 6:
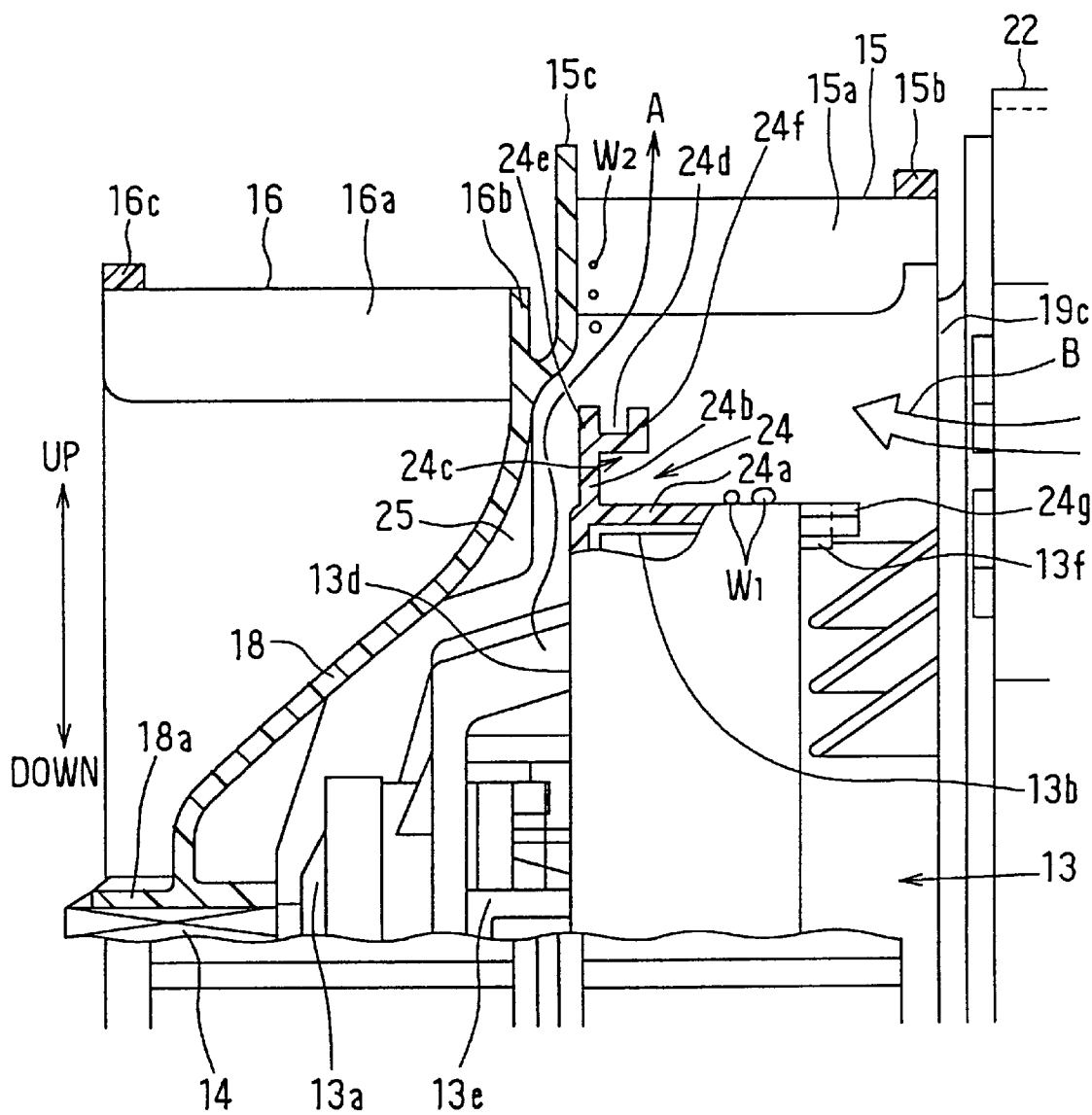
FIG. 6 is an enlarged sectional view showing a main portion of a blower unit according to a second preferred embodiment of the present invention.

A second preferred embodiment of the present invention will be now described with reference to FIG. 6.

In the above-described first embodiment, the second wall 24*f* is formed on an extending line of the flange portion 24*b* of the water-prevention member 24 in a radial direction of the first fan 15. However, in the second embodiment, as shown in FIG. 6, the flange portion 24*b* is shifted toward the side of the connection member 18, the first wall 24*e* is formed on the extending line of the flange portion 24*b* in the axial direction, and the second wall 24*f* is disposed at an offset position shifted from the flange portion 24*b* in the radial direction. The water-prevention member 24 in the second embodiment has the same operation effect as that in the first embodiment. In the second embodiment, the other portions are similar to those in the first embodiment, and the explanation thereof is omitted.

Figure 7:
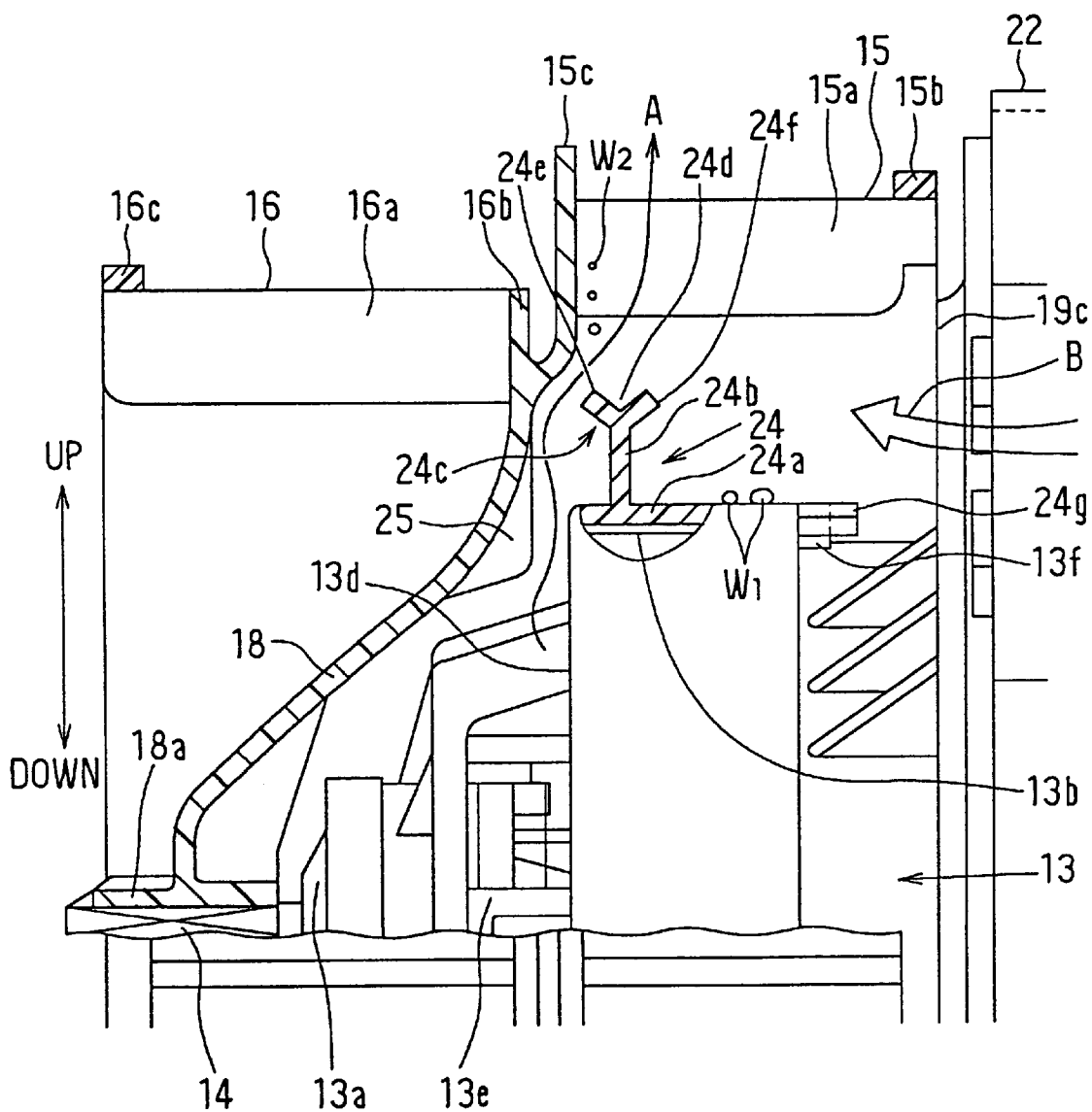
FIG. 7 is an enlarged sectional view showing a main portion of a blower unit according to a third preferred embodiment of the present invention.

A third preferred embodiment of the present invention will be now described with reference to FIG. 7.

In the above-described first and second embodiments, the groove portion 24*c* of the water-prevention member 24 is formed approximately in a U-shape in cross section. However, in the third embodiment, the groove portion 24*c* is formed approximately in a V-shape in cross section. Even if the groove portion 24*c* has the V-shaped cross section, the groove portion 24*c* has the same operation effect as that in the first and second embodiments. In the third embodiment, the other portions are similar to those in the first embodiment, and the explanation thereof is omitted.

Although the present invention has been fully described in connection with the preferred embodiments thereof with reference to the accompanying drawings, it is to be noted that various changes and modifications will become apparent to those skilled in the art.

For example, in each of the above-described embodiments, the water-prevention member 24 is formed along all the outer peripheral portion of the body case 13*b* of the motor 13 to have a ring shape. However, the water-prevention member 24 may be formed only on an upper outer peripheral portion of the body case 13*b*, because the water-prevention member 24 is provided for preventing water from flowing into the motor 13. That is, the water-prevention member 24 may be formed in an incomplete ring shape without covering a lower outer peripheral portion of the body case 13*b*. Further, the groove portion 24*c* may be formed in an arbitrary shape having a water-receiving structure. Further, the water-prevention member 24 may be formed by a first and second ribs protruding from the outer peripheral surface of the body case 13*b*. In this case, the first and second ribs may be disposed to form a groove portion for receiving the dropped water, and may be formed integrally.

Further, in each of the above-described embodiments, the first and second air passages 20, 21 are partitioned from each other in the blower unit 1. However, the present invention may be applied to a blower unit where a motor is disposed approximately horizontally to penetrate through a suction port of a fan, for sucking outside air.

Such changes and modifications are to be understood as being within the scope of the present invention as defined by the appended claims.

What is claimed is:

1. A blower unit for an automobile air conditioner, said blower unit comprising:

a casing for forming an air passage, said casing having a suction port for introducing therein outside air;

a centrifugal fan, for sucking air from said suction port, said centrifugal fan having a first end and a second end in an axial direction thereof;

a motor having a rotation shaft disposed approximately horizontally, said motor being disposed at an inner peripheral side of said centrifugal fan to penetrate through said suction port;

a connection member which connects said first end of said centrifugal fan to said rotation shaft of said motor; and a first rib which is disposed at least on an upper portion of an outer peripheral surface of said motor at an inner peripheral side of said first end of said centrifugal fan to prevent water dropped on said outer peripheral surface from moving to a side of said connection member, wherein said first rib has an end extending to an outer peripheral side of said centrifugal fan, said end of said first rib being positioned adjacent to said connection member.

2. The blower unit according to claim 1, wherein said first rib is formed along all said outer peripheral surface of said motor to have a ring shape.

3. The blower unit according to claim 1, further comprising a second rib protruding from said outer peripheral surface of said motor, said second rib having an end extending to said outer peripheral side of said centrifugal fan, wherein said second rib is formed at a side of said first rib to be far from said connection member in said axial direction.

4. The blower unit according to claim 3, wherein said first rib and said second rib are disposed to form a groove portion for receiving water dropped from said first end of said centrifugal fan along said connection member.

5. The blower unit according to claim 3, wherein said first rib and said second rib are formed integrally.

6. The blower unit according to claim 4, wherein said groove portion has a U-shaped cross section.

7. The blower unit according to claim 4, wherein said groove portion has a V-shaped cross section.

8. The blower unit according to claim 3, wherein:

said second rib has a height extending from said outer peripheral surface of said motor; and said height of said second rib is higher than that of said first rib.

9. The blower unit according to claim 1, further comprising a groove portion at the end of said first rib, wherein said groove portion is disposed to receive water dropped from said first end of said centrifugal fan along said connection member.

10. The blower unit according to claim 1, further comprising an air duct for introducing air from a positive pressure portion at an air outlet side of said centrifugal fan into said motor, said air duct forming a part of a cool air passage through which air for cooling said motor flows, wherein:

said cool air passage is provided in such a manner that air is introduced from said positive pressure portion of said centrifugal fan to one end portion of said motor at a side of said second end of said centrifugal fan, and flows to an air suction side of said centrifugal fan from the other end portion of said motor at a side of said connection member after being passed through said motor;

said connection member includes supplementary blades formed on a surface at a side where said cool air passage is provided; and said supplementary blades blow air having passed through said motor to said air suction side of said centrifugal fan.

11. A blower unit for an automobile air conditioner which can set a double layer mode where both inside air and outside air are blown into a passenger compartment while being partitioned from each other, said blower unit comprising:

a first casing having a first suction port for introducing outside air during said double layer mode, said first casing forming a first air passage through which outside air flows during said double layer mode;

a second casing having a second suction port for introducing inside air during said double layer mode, said second casing forming a second air passage through which inside air flows during said double layer mode;

a first centrifugal fan, disposed in said first casing, for blowing air sucked from said first suction port;

a second centrifugal fan, disposed in said second casing, for blowing air sucked from said second suction port;

a motor having a rotation shaft disposed approximately horizontally, said motor being disposed at an inner peripheral side of said first centrifugal fan to penetrate through said first suction port;

a connection member disposed to partition said first and second air passages from each other, said connection member connecting one end of said first centrifugal fan in an axial direction to said rotation shaft of said motor; and a water-prevention member which is disposed at least on an upper portion of an outer peripheral surface of said motor at an inner peripheral side of said one end of said first centrifugal fan to prevent water dropped on said outer peripheral surface from moving to a side of said connection member, wherein said water-prevention member has a groove portion for receiving water dropped from said one end of said first centrifugal fan along said connection member.

12. The blower unit according to claim 11, wherein said water-prevention member is formed along all said outer peripheral surface of said motor to have a ring shape.

13. The blower unit according to claim 11, wherein said groove portion has a U-shaped cross section.

14. The blower unit according to claim 11, wherein said groove portion has a V-shaped cross section.

15. The blower unit according to claim 11, wherein said groove portion includes a recess portion for receiving dropped water, a first wall disposed at one end of said recess portion in said axial direction, adjacent to said connection member, and a second wall disposed at the other end of said recess portion in said axial direction.

16. The blower unit according to claim 15, wherein said second wall has a height higher than that of said first wall.

17. The blower unit according to claim 11, wherein:

said water-prevention member includes an inner peripheral portion disposed on said outer peripheral surface of said motor, and an attachment claw portion extending from said inner peripheral portion in said axial direction;

said motor has a protrusion portion protruding from said outer peripheral surface of said motor; and said attachment claw portion has an attachment hole in which said protrusion portion of said motor is inserted to be engaged from each other so that said water-prevention member is attached to said outer peripheral surface of said motor.

18. A blower unit for an automobile air conditioner, said blower unit comprising:

a casing for forming an air passage, said casing having a suction port for introducing therein outside air;

a centrifugal fan, for sucking air from said suction port, said centrifugal fan having a first end and a second end in an axial direction thereof;

a motor having a rotation shaft disposed approximately horizontally, said motor being disposed at an inner peripheral side of said first end of said centrifugal fan to penetrate through said suction port;

a connection member which connects said first end of said centrifugal fan to said rotation shaft of said motor; and water-prevention means for preventing water contained in outside air from flowing into said motor, said water-prevention means being provided at least on an upper portion of an outer peripheral surface of said motor at an inner peripheral side of said first end of said centrifugal fan, adjacent to said connection member.

19. The blower unit according to claim 18, wherein said water-prevention means is formed along all said outer peripheral surface of said motor to have a ring shape.

20. The blower unit according to claim 18, wherein:

said water-prevention means includes a groove member for receiving water dropped from said first end of said centrifugal fan along said connection member; and said groove portion includes a recess portion for receiving the dropped water, a first wall disposed at one end of said recess portion in said axial direction, adjacent to said connection member, and a second wall disposed at the other end of said recess portion in said axial direction.

* * * * *